United States Patent
Piatt et al.

(10) Patent No.: US 7,050,196 B1
(45) Date of Patent: May 23, 2006

(54) COLOR PRINTER CALIBRATION

(75) Inventors: Michael J. Piatt, Dayton, OH (US); Terry Wozniak, Springfield, OH (US); Christopher L. Watkins, Fairborn, OH (US)

(73) Assignee: Eastman Kodak Company, Rochester, NY (US)

( * ) Notice: Subject to any disclaimer, the term of this patent is extended or adjusted under 35 U.S.C. 154(b) by 971 days.

(21) Appl. No.: 09/597,534

(22) Filed: Jun. 20, 2000

(51) Int. Cl.
*G06F 15/00* (2006.01)
*G03F 3/08* (2006.01)
*G06K 9/00* (2006.01)

(52) U.S. Cl. ................... 358/1.9; 358/520; 382/165
(58) Field of Classification Search ............... 358/1.9, 358/1.14, 518, 520, 540, 3.32, 3.33; 347/14, 347/15, 19, 43, 131; 702/85; 382/168, 165, 382/162; 356/402; 101/171, 211
See application file for complete search history.

(56) References Cited

U.S. PATENT DOCUMENTS

| | | | | |
|---|---|---|---|---|
| 5,333,069 A | * | 7/1994 | Spence | 358/517 |
| 5,363,318 A | * | 11/1994 | McCauley | 702/85 |
| 5,493,321 A | * | 2/1996 | Zwadlo | 347/131 |
| 5,594,840 A | * | 1/1997 | Sahay et al. | 358/1.14 |
| 5,633,662 A | * | 5/1997 | Allen et al. | 347/15 |
| 5,748,330 A | * | 5/1998 | Wang et al. | 358/3.21 |
| 5,751,434 A | * | 5/1998 | Narendranath et al. | 358/1.9 |
| 5,881,209 A | * | 3/1999 | Stokes | 358/1.9 |
| 5,901,243 A | * | 5/1999 | Beretta | 382/168 |
| 6,003,979 A | * | 12/1999 | Schneider et al. | 347/74 |
| 6,172,692 B1 | * | 1/2001 | Huang et al. | 347/43 |
| 6,205,246 B1 | * | 3/2001 | Usami | 382/167 |
| 6,233,061 B1 | * | 5/2001 | Huang et al. | 358/1.9 |
| 6,351,308 B1 | * | 2/2002 | Mestha | 356/402 |
| 6,351,320 B1 | * | 2/2002 | Shin | 358/1.9 |
| 6,483,518 B1 | * | 11/2002 | Perry et al. | 345/590 |
| 6,484,631 B1 | * | 11/2002 | Degani et al. | 101/171 |
| 6,504,625 B1 | * | 1/2003 | Amero et al. | 358/1.9 |
| 6,512,597 B1 | * | 1/2003 | Cooper et al. | 358/1.9 |

(Continued)

FOREIGN PATENT DOCUMENTS

JP 2000326666 A * 11/2000

*Primary Examiner*—Madeleine Nguyen
(74) *Attorney, Agent, or Firm*—William R. Zimmerli

(57) ABSTRACT

The present invention addresses the quantification of a printed tone scale for each individual color in a printing system, developing a linear tone scale derived in an independent color space and referenced from the shade of the unprinted substrate. The present invention determines the threshold for excessive ink coverage of a printing system on a specified substrate. This determination is based on a subjective evaluation of acceptable thresholds for bleed, cockle, show through, and image density. The method works in conjunction with a predefined test pattern printed on the specified substrate at fixed printing parameters, such as speed, dryer temperature, and web tension. This invention also includes an ability to limit the ink of each independent color in the system as a fraction of the total upper ink limit. Furthermore, this invention allows calibration of the tone scale of each color in the system using the color of the paper as a reference point. In addition, this invention facilitates the generation of separate sets of tone scale transformations for both graphics and text for each color in the system.

14 Claims, 6 Drawing Sheets

U.S. PATENT DOCUMENTS

| | | | |
|---|---|---|---|
| 6,513,899 B1 * | 2/2003 | Watkins | 347/19 |
| 6,575,095 B1 * | 6/2003 | Mahy et al. | 101/485 |
| 6,585,340 B1 * | 7/2003 | Borrell | 347/14 |
| 6,731,405 B1 * | 5/2004 | Samworth | 358/3.06 |
| 6,755,498 B1 * | 6/2004 | Revie et al. | 347/15 |
| 2001/0013894 A1 * | 8/2001 | Parulski et al. | 348/207 |
| 2001/0028471 A1 * | 10/2001 | Hirakazu | 358/1.13 |
| 2002/0012038 A1 * | 1/2002 | Xu et al. | |
| 2002/0039181 A1 * | 4/2002 | Shakespeare et al. | |
| 2002/0080378 A1 * | 6/2002 | Nishida et al. | |
| 2003/0025925 A1 * | 2/2003 | Elsman et al. | |
| 2003/0117639 A1 * | 6/2003 | Milton et al. | |
| 2004/0021879 A1 * | 2/2004 | Castelltort et al. | |

* cited by examiner

COLOR PRINTER CALIBRATION

TECHNICAL FIELD

The present invention relates to image processing and, more particularly, to optimizing substrate specific image quality from a printing system.

BACKGROUND ART

Ink jet printing systems are known in which a print head defines one or more rows of orifices which receive an electrically conductive recording fluid, such as for instance a water based ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

In certain printing systems, particularly ink jet printing systems, the amount of ink or other colorant applied to the substrate must be limited. In the case of high speed ink jet printing systems, using water based dye inks, ink limiting is of particular concern to avoid degradation of the substrate. Excessive water causes the paper to stretch and wrinkle. This problem is amplified by web tensioning in high speed roll to roll systems. A careful balance between ink loading, print speed, web tension, and drying power, must be maintained. This invention solves two related problems. It identifies the upper ink limit for the above mentioned parameters. Secondly, it linearizes the tone scale of each ink in the system from the substrate color to the maximum ink limit. In the past, the dependency between ink and substrate has not been as pronounced. High speed ink jet systems that add a lot of water to the paper in a short period of time have compounded this problem.

In the prior art, upper ink limits for a few selected substrates were predefined by printer manufacturers. High speed digital presses will be operated with a number of substrates of unknown ink compatibility. In addition, the color of these unprinted substrates may vary significantly. Also, the color of ink available in the system may change on a regular basis.

It is seen, therefore, that it would be desirable to have a technique for solving the problem of universal calibration procedures for any set of inks, substrates, and machine configurations.

SUMMARY OF THE INVENTION

The present invention addresses the quantification of a printed tone scale for each individual color in a printing system. Specifically, it discloses a novel approach for developing a linear tone scale derived in an independent color space and referenced from the shade of the unprinted substrate. In addition, it identifies methods and means to limit the amount of colorant added to the substrate to assure compatibility with the print media.

In accordance with one aspect of the present invention, a method is provided for determining the upper ink limit of a printing system on a specified substrate. This determination is based on a subjective evaluation of acceptable thresholds for bleed, cockle, show through, and image density. The method works in conjunction with a predefined test pattern printed on the specified substrate at fixed printing parameters, such as speed, dryer temperature, and web tension. This invention also includes an ability to limit the ink of each independent color in the system as a fraction of the total upper ink limit. Furthermore, this invention allows calibration of the tone scale of each color in the system using the color of the paper as a reference point. In addition, this invention facilitates the generation of separate sets of tone scale transformations for both graphics and text for each color in the system.

Other objects and advantages of the invention will be apparent from the following description, the accompanying drawings and the appended claims.

DETAILED DESCRIPTION OF THE PREFERRED EMBODIMENTS

The present invention optimizes image quality in a printer as a function of the inking system and the substrate accepting the ink. A single page test pattern has been devised that allows one to accomplish this task. This test page is printed on the printer at the same operational conditions as the actual print job to be optimized. The pattern is so constructed to bracket the practical usable range of ink loading on a variety of substrates. In this way, a substrate of unknown characteristics can be quantified through a series of steps that identify the upper ink limit for graphics, the optimum text printing density, and the calibration of the tone scale for each ink in the system based on the color of the unprinted substrate.

Any suitable test pattern can be selecting, realizing that any number of patterns can be devised to accomplish the objectives of the present invention. This invention discloses the general methods and principles applied to any such test pattern that contain the necessary characteristics for the evaluation described herein.

Figure 1:
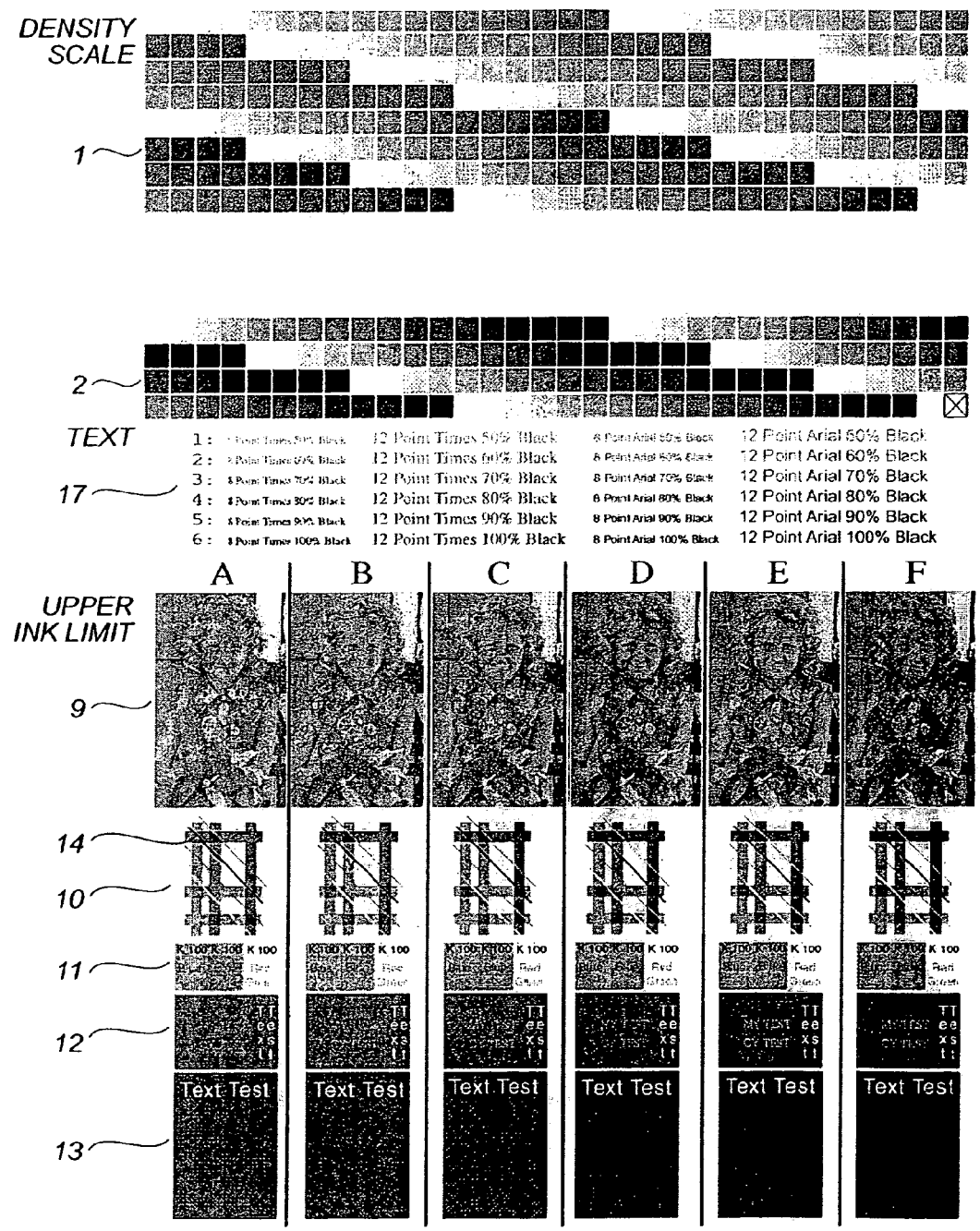
FIG. 1 illustrates a typical set of test patterns used for calibration in accordance with the present invention.

Referring now to FIG. 1, the first step in calibration is to determine the shape of the tone curve for each ink in the system, referenced to the color of the unprinted substrate. This pattern is scanned by a spectrophotometer that determines the three dimensional color coordinates of each test patch as well as that of the substrate. The single primary color test patches 1 and the black ink test patches 2 are linearly increasing in applied inking level over the entire dynamic range of the printing system. Depending on the printing system, this may be accomplished through various ink droplet dispersion techniques. In the case of binary ink jet printing systems, error diffusion and/or dither algorithms can be employed to obtain the necessary distribution of ink on the substrate.

Figure 2:
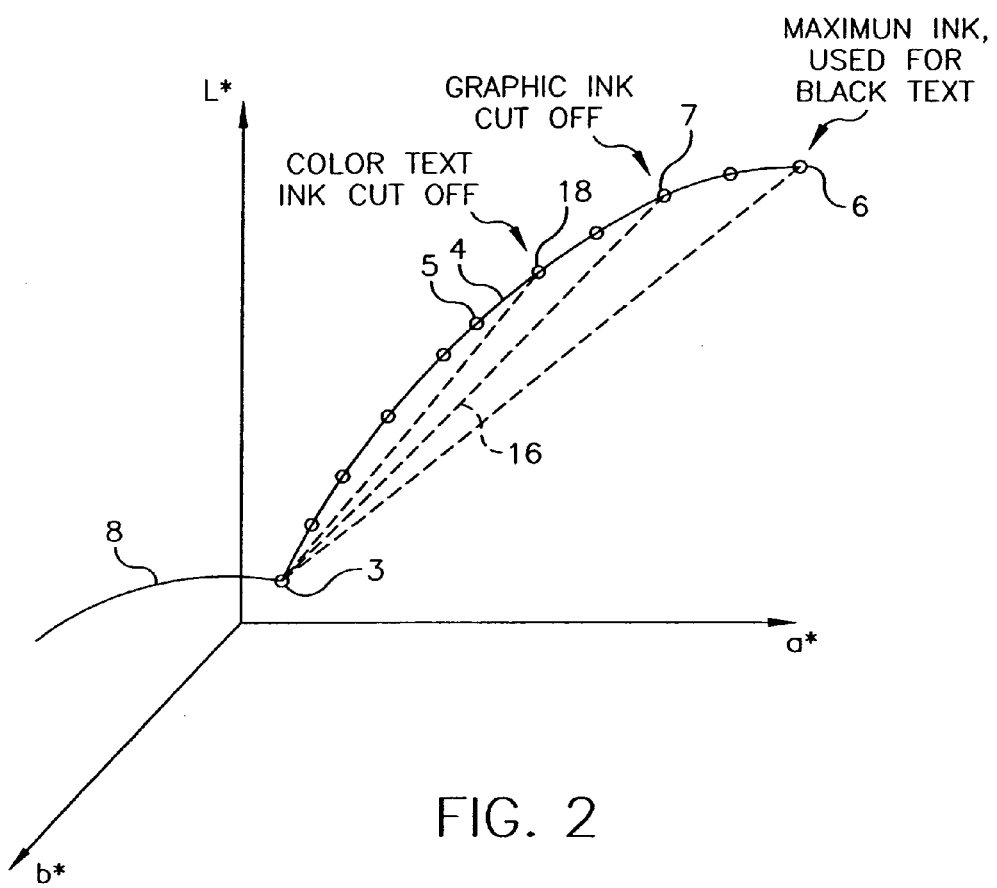
FIG. 2 is a typical tone scale curve.

It has been determined through experimentation that there is typically a nonlinear relationship between the amount of ink added to the substrate and the overall intensity of the reflected color. A tone scale unit scale shall be defined as a unit of distance between the substrate color and a specified color sample, when plotted in a three dimensional independent color coordinate system. A typical tone scale curve is illustrated in FIG. 2. The coordinates of the substrate color are identified at 3. The curve 4 is typical of the coordinates obtained from the graduated inking scale printed on the test page. The discrete points 5 are measured from the sample. Curve fitting algorithms, such as the method of least squares, are used to fit a curve to the discrete points. The maximum ink point at 6, for black text is identified by examining the text pattern 17. The different rows of text that form this pattern are printed at different inking densities. The inking density above which the print quality of the text is the maximum ink point 6 which represents the furthest distance from the color of the substrate. Typically, one cannot print at this maximum intensity due to limitations in the system, such as the ability to dry the substrate. An ink cutoff point 7 is identified in FIG. 2 as being a realistic maximum ink point for graphics, while an ink cutoff point 18 is identified in FIG. 2 as being a realistic maximum ink point for color text. Just for reference, a second curve 8, representing another ink in the same printing system is also shown in FIG. 2. It will be appreciated that any number of such curves representing any ink color can be represented in the same fashion.

The upper ink limit for graphics printing 7 are determined from the test pattern. It is based on determination of image intensity using pattern 9, bleed between the colors using pattern 14, reverse text fill in using pattern 12–13, paper cockle using pattern 13, and show through to the back side of the paper using patterns 9, 14, 10, 11, 12, or 13. On the pattern there are typically multiple choices that indicate a usable range of ink loading on a variety of substrates. Only one cutoff value is selected for a given job. The selection process is determined as the maximum acceptable value for the limiting condition. Depending on the actual job data, the limiting condition will vary from one test parameter to another. For example, bleed may be important for heavy text coverage over a dark background. Cockle may be most important for image graphics applications. Show through is important for duplex printing, and so forth.

Once the operator selects an total upper ink limit for graphics, the individual upper ink limits are derived by dividing the total upper ink limit by three and assigning all four colors in the system this same value. The test patterns are constructed in such a way to facilitate this derivation. For example, the images of pattern 9 of each different upper ink limit shown as part of the test pattern in FIG. 1 have been designed with upper ink limits of the primary colors equal to 33% of the total upper ink limit in the picture. To further explain this example, a given image on the test page may have an upper ink limit of 150% for each pixel in the image as determined by the loss of image detail in the shadow areas of pattern 9. A pixel is made of ink contributions from the three primary colors and black. Each of these inks is set at an individual upper ink limit of 50%. The assumption is made that all colors represented by 200% total ink limit can also be represented with 150% total ink limit because black is not an independent color. Black is used to represent some combination of the three primary colors on a pixel by pixel basis. Hence, the total upper ink limit is the sum of the individual upper ink limits minus the upper ink limit of any color gamut redundant colors, such as black. Another selection will have a different upper ink limit, but the relative distribution between the colors will remain constant for all selections.

The next test pattern 10 used in determination of the upper ink limit is a color-to-color ink bleed pattern. In this pattern, each of the primary inks is printed over the top of the previously printed ink in the system to form a grid pattern. The orthogonal grid lines are printed at the maximum cutoff point for each of the individual primary colors. The user should examine the intersection of different color inks to identify feathering of the edges. This feathering will increase the width of the grid line in the area of overlap with another color. Typically, the inks are formulated with similar physical properties so that there is no preferential bleeding of one color into another. However, certain substrates, particularly coated ones, may have a propensity to feather one ink more than another. The diagonal lines 14 on the grid pattern are set at the typical inking level for text. They represent printed text on a colored background. Feathering of the diagonal lines should also be noted as part of the determination of the color text 18 ink cut off in FIG. 2. Again, the decision is based on the application. For text documents printed over a color background, the evaluation of this pattern is of significance. For graphic images, it is less important.

The test pattern page is also used to evaluate text bleed. The background color is printed at the upper ink limit for graphics for each of the three primary (cyan, magenta, yellow) colors. The text in the middle of the square is printed with each combination of two of the three primaries 11, 12. This is accomplished by simply eliminating the third color in the text region. The purpose of this pattern is to look for fill in of the text by the third unprinted color, due to color-to-color bleed. If the text is filled in by the unprinted color, or colors, the upper ink limit for color text 18 should be reduced to a point where all the text in the pattern is legible. Even though this pattern is set at the graphics ink cut off limit, text fill in is a good indication of excessive bleed that will degrade edge definition in graphics images.

Finally, the pattern 13 in the test page is used to evaluate cockle and show through. The test pattern is printed with the three primary colors and black, each at 75% of their independent upper ink cutoffs for graphics. The total ink coverage in this patch is 300% (75%×4) and represents 75% of the total ink limit of 400% for each independent trial. It is recognized that most colors in the usable gamut of a cyan, magenta, yellow and black (CMYK) system can be printed with an ink loading of 300%, since black is redundant. Cockle is determined by viewing and/or feeling the surface flatness of the printed substrate from the back (unprinted side) over the area of the test patch. Similarly, show through is determined by viewing or measuring the darkness of the back (unprinted side) of the substrate opposite the region the test patch.

The printer operator is requested to make a selection for the upper ink limit for graphics, based on these test patterns and the nature of the job to be printed. The value is input into a software utility that divides the selected total ink limit by three and applies that limit to each of the primary colors, as well as to black. It is assumed that any color in the printable gamut can be accurately approximated with full coverage of three of the four inks in the system. Black is redundant and is used to reduce the total ink consumption and provide a single ink for black text. This is how the ink cutoff 7 of FIG. 2 is determined.

Figure 3:
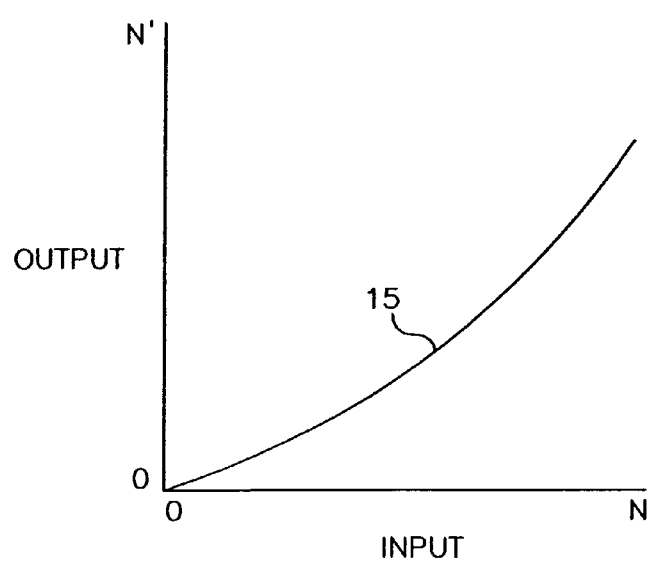
FIG. 3 is the inversion of the curve of FIG. 2.

It is generally desirable to have a linear relationship in the tone scale over the entire range of printable densities. In order to accomplish this, an input/output transfer function is derived that will operate on the incoming continuous tone color data before it is converted into binary form using some droplet dispersion algorithm such as, error diffusion or dither matrices. The first step in obtaining a linear tone response is to generate a function describing the actual tone scale curve between paper white and the upper ink limit for an individual ink. This curve 4 of FIG. 2 is inverted as curve 15 of FIG. 3. By transforming the input image data through a look up table that is opposite to the nonlinearity of the original tone curve, the resulting tonal response to the new transformed data will be linear. The new transformed linear tone curve is shown as 16 in FIG. 2. It passes through the substrate color point 3 and the ink cutoff point 7 in the L*a*b* independent color coordinate system. This color coordinates system is well know to those in the art as a standard for the purpose of defining and transferring color information. The same process is repeated for each of the primary colors and black in a processed color printing system. A system containing one or more nonprimary spot colors can be calibrated by the same procedure.

The requirements for obtaining good text quality are significantly different from those of graphics. Text is typically printed with a single color, usually black. It is desirable to have the inking level sufficiently high to allow the individual droplets, derived from the binary conversion algorithms, to overlap each other. This can be accomplished by forcing the black text to print at a denser upper ink limit than that used for graphics. The test page is used for determination of the black text ink limit. Various font styles and point sizes are included in this portion of the test page. Each sample is printed with a different amount of black ink. The operator should select the darkest text while avoiding edge raggedness as a result of excess ink that wicks along the paper fibers or other surface irregularities. This point is typically in the upper third of the tone scale range. From this value, the associated software algorithm assigns colored text ink limits at approximately that of the black text threshold. The reason for this assignment is so that processed color text, made from two inks, can be printed without excessive feathering. The software applies one additional condition to the determination of the upper ink limit for colored text. In order to obtain fully formed characters after drop dispersion algorithms are applied to text data printed with only one primary color, a minimum threshold density is imposed upon the colored text cut off point, even if it is greater than 50% of the black text cutoff point. Both the black text upper ink cutoff 6 and the other primary color text ink cutoffs 18 are shown in FIG. 2. The same curve fitting and transformation routines used for graphics are applied to these new curves to obtain linear tone response to text data. As previously mentioned, the diagonal lines in the test pattern can also be used to show the interaction of printing black and colored text on top of background image data. Obviously, if one wished to print a specific spot color at the optimum density, the test pattern could be modified to substitute this color for black.

Figure 5:
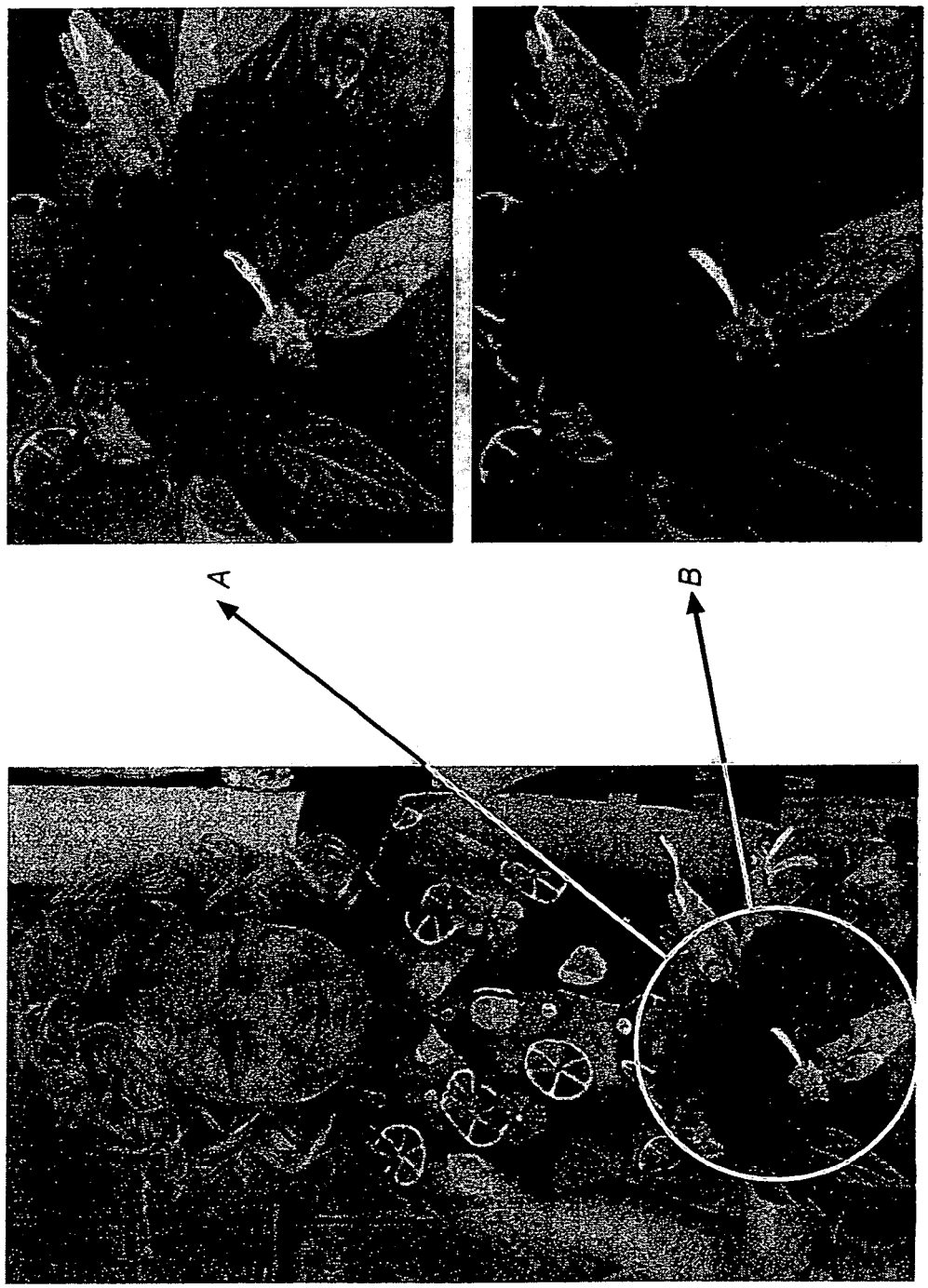
FIG. 5 shows example images with correct and excessive ink limits.
Figure 6:
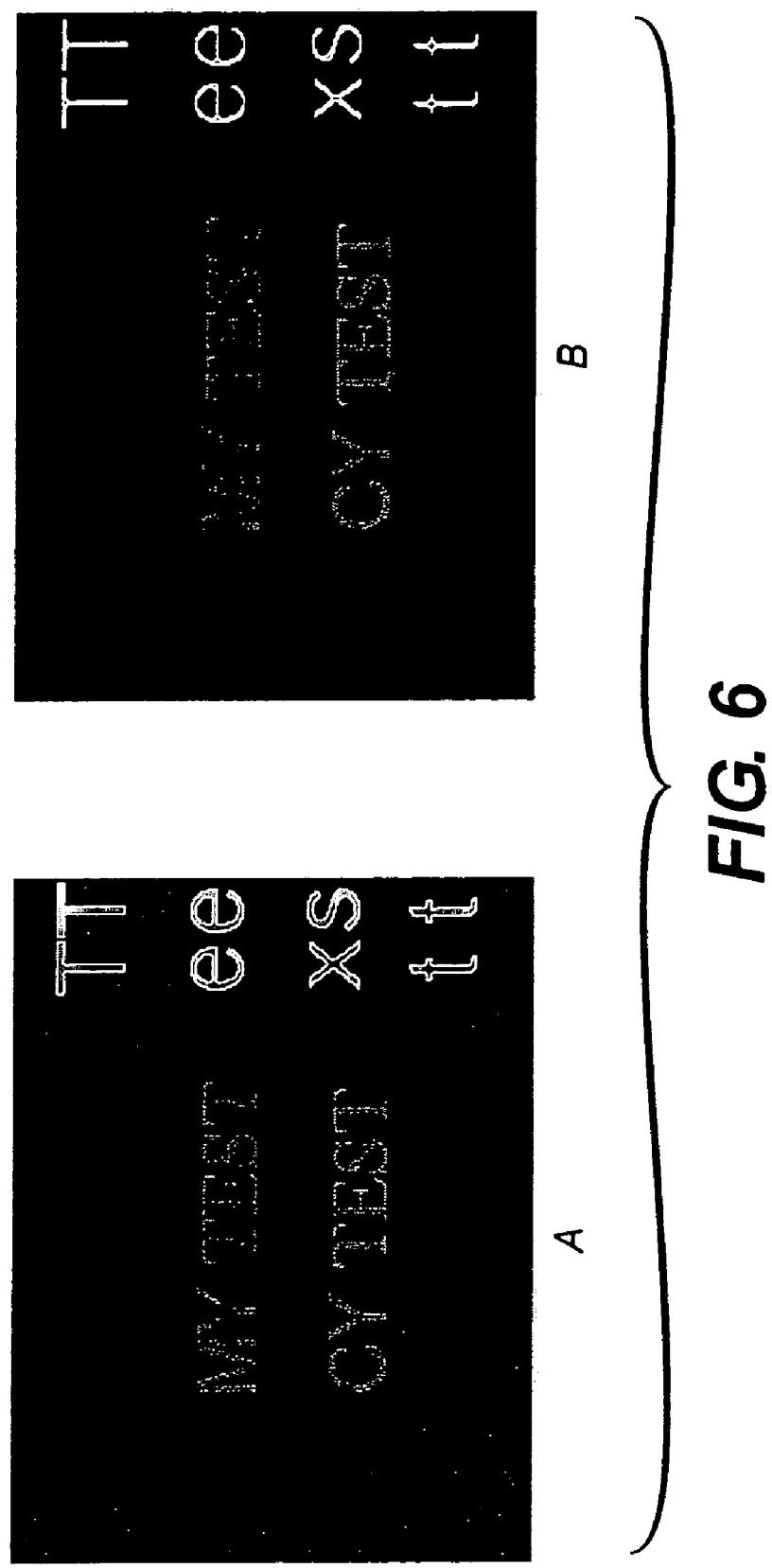
FIG. 6 shows example text with correct and excessive ink limits.

The determination of upper ink limits for graphics and text are somewhat subjective decisions based upon the type of printing contained in the job. FIG. 5 shows a typical graphics image. Excessive ink causes the detail to be lost in the shadow area. Magnified area A shows an appropriate upper ink limit to maintain image detail. Section B shows the same magnified area with a selected upper ink limit that masks detail in the shadows. FIG. 6 shows the same conditions for text printing on a dark background. The text in area A is more legible than the text in area B. The text in area B is filled in with the background color because the upper ink limit is too high. The images and test of FIGS. 5 and 6 are shown for purposes of example only, but it will be obvious to those skilled in the art that multiple other similar patterns can be used to obtain the same results.

The derivation of tone scale curves from spectrophotometer scans and the subjective determination of upper ink limits work in conjunction with the proper image processing software necessary to define an integrated workflow. The entire tone scale calibration process is shown schematically in FIGS. 4A and 4B. The inventive features identified in this disclosure are a subset of the total workflow solution.

Figure 4A:
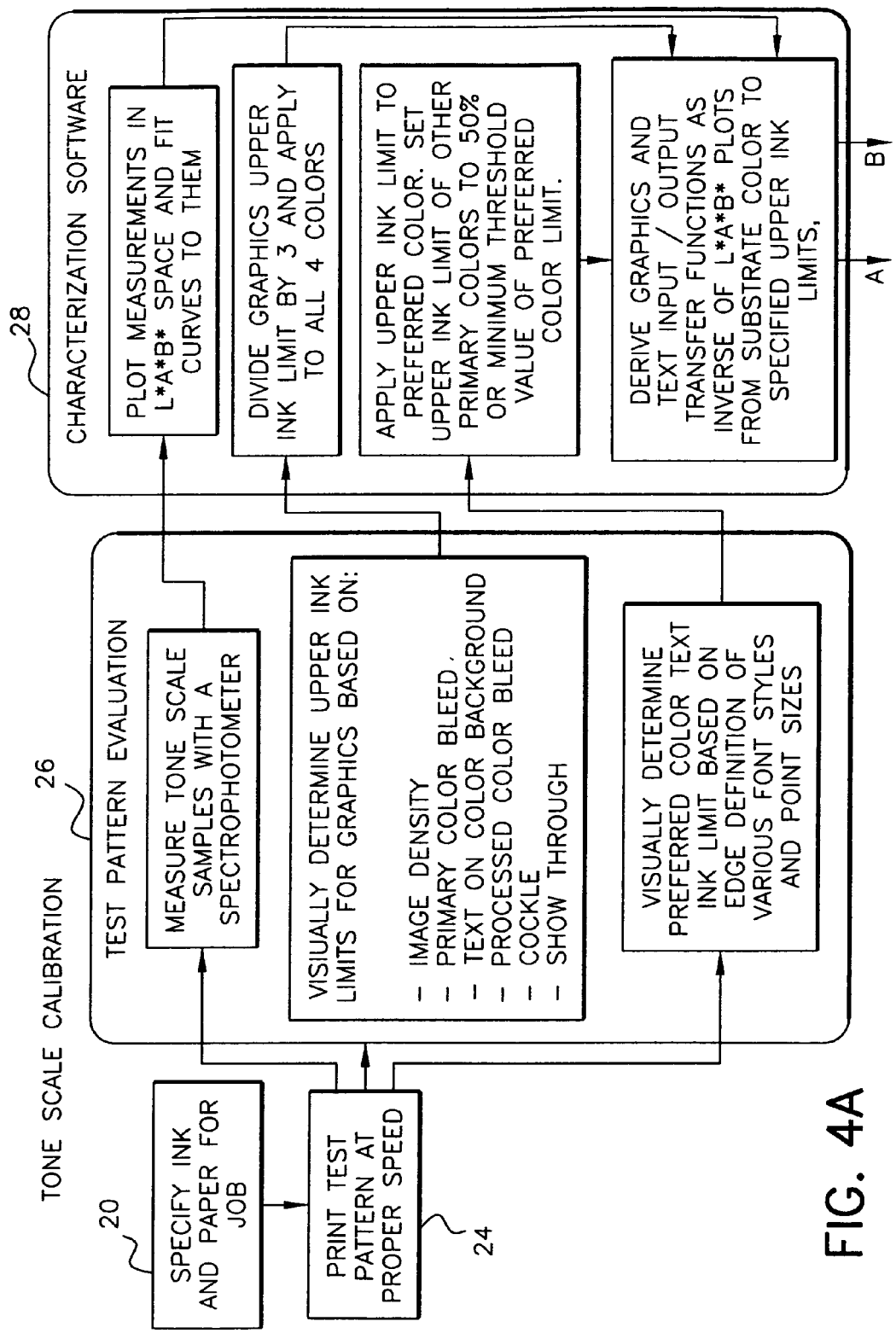
FIGS. 4A and 4B are a block diagram of the calibration process of the present invention.
Figure 4B:
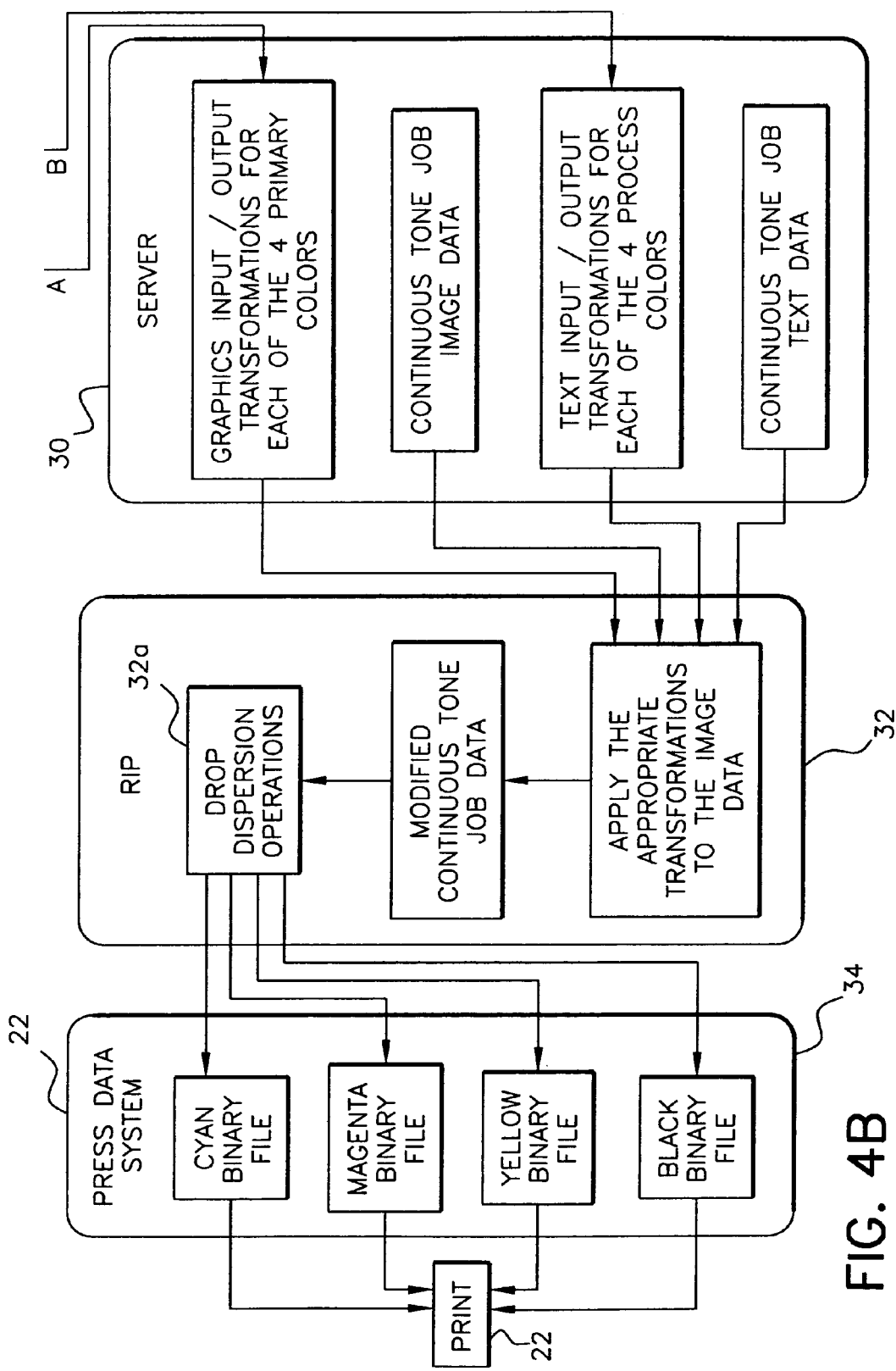

The processes defined in FIGS. 4A and 4B are serial in nature. Starting with the specification of inks and substrates 20 for a specific job and ending with the actual printing 22 of the ink/media specific processed imaged data. Following through the steps of the workflow, first the test pattern is printed 24, as defined in FIG. 1. As previously described, the tone scale color blocks 1 are measured with a spectrophotometer. The operator visually determines the upper ink limits for graphic images and the preferred text color 26. This data is input into characterization software that derives two sets of curves or input/output transfer functions 28. One set is specific to graphic images and the other set is specific to text. There can be a separate look up table (LUT) generated for each of the primary colors on the system for both text and graphics stored on the server along with the unmodified graphics and text data. Following through the process as shown in FIGS. 4A and 4B, after the transfer functions 30 are generated from the characterization software, the graphics and text image data are operated upon and transformed by the appropriate function in the RIP 32. Finally, the droplet dispersions algorithms, such as error diffusion and/or dither matrices are applied to the transformed continuous tone data to reduce it to binary data 32a. The binary files are an accurate representation of the original continuous tone data but have been tailored for the a specific substrate that is to be printed at a specific speed. Finally, these image files are loaded into the printer data system and imaged on the press 34.

The calibration technique of the present invention has numerous advantages. Tone scales are linearized based on delta "E" measurements from the substrate color in L*a*b* color space, allowing accurate calibration of any ink color on any substrate. A single page test pattern is used to determine the upper ink limit based on a number of ink/substrate parameters including: cockle, show through, bleed, image quality. The patterns are defined to be representative of expected results for a specific upper ink limit. The upper ink limit test pattern contains images representative of the entire usable range of ink loading over a variety of substrates so that the operator can make comparative decisions. In a preferred embodiment of the invention, this pattern can and should be run at the same print speed as the actual job. Separate calibration curves are generated for both text and graphics from the same test page. Therefore, job preparation software can take advantage of the dual text/graphics mode, by using separate transformations for each.

The invention has been described in detail with particular reference to certain preferred embodiments thereof, but it will be understood that modifications and variations can be effected within the spirit and scope of the invention.

What is claimed is:

1. A method of defining printer media and inking intensity compatibility in a printing system comprising the steps of:
   identifying a printer employing specified color inks for use in color printing, and identifying a color substrate for use in color printing;
   printing a color test pattern of a plurality of test patches on the identified substrate, with the identified printer;
   generating a tone scale curve for each color ink in the color test pattern, using the plurality of test patches;

selecting one limiting condition that controls color ink and color substrate compatibility for the identified printer and the identified substrate;

determining an upper ink limit for the identified substrate based on ink and substrate parameters in accordance with the one limiting ink condition; and using the upper ink limit to generate a tone scale to calibrate any ink color employed by the identified printer for printing on the identified substrate.

2. A method as claimed in claim 1 wherein the step of generating a tone scale curve comprises the steps of:

measuring the color test pattern in L*a*b* color space referenced from substrate color; and using Euclidian distance from the substrate color as a measure of color intensity.

3. A method as claimed in claim 2 further comprising the steps of:

fitting a curve to the L*a*b* data plot defined by the substrate color;

linearly increasing applied ink level to a specified upper ink limit; and deriving a corresponding one dimensional transform that will operate on imaging data to force the imaging data to conform to a predetermined data.

4. A method as claimed in claim 3 further comprising the step of generating a transfer function that produces a linear relationship from the substrate color to a maximum ink limit in L*a*b* color space.

5. A method as claimed in claim 1 wherein the plurality of test patches linearly increase in applied inking level over an entire dynamic range of the printing system.

6. A method as claimed in claim 1 further comprising the step of using a spectrophotometer to scan the color test pattern to determine a three-dimensional color coordinate of each of the plurality of test patches and the substrate.

7. A method as claimed in claim 1 wherein the step of determining an upper ink limit comprises the steps of:

determining a first upper ink limit for preferred color text;

determining a second upper ink limit for graphics.

8. A method as claimed in claim 7 wherein the upper ink limit of each ink color in a printing is derived from a subjective determination of the total upper ink limit.

9. A method as claimed in claim 1 wherein the upper ink limit of each ink color in a printing used for graphics is derived from a subjective determination of the total upper ink limit.

10. A method as claimed in claim 1 wherein the upper ink limit of each of the colors in a printing for text is derived from the subjective determination of the total upper ink limit for the preferred text color.

11. A method as claimed in claim 1 wherein the color test pattern comprises a test pattern containing image and graphics data that brackets a usable range of ink loading over a range of acceptable substrates for color printing operations to determine a suitable upper ink limit on a particular substrate.

12. A method of defining printer media and inking intensity compatibility in a printing system comprising the steps of:

identifying a printer having a plurality of inks and a substrate for use in color printing;

printing a color test pattern with the identified printer and the identified substrate;

employing a portion of the color test pattern for generating a tone curve for each of the plurality of inks;

employing a portion of the color test pattern for determining the threshold for excessive ink coverage for the identified printer and substrate; and re-calibrating a range of tone scale to remain below the threshold of excessive ink coverage for the plurality of inks on the identified substrate, wherein the color test pattern comprises a pattern which identifies when one of ink bleed is excessive, ink drying time is excessive, ink bleed through is excessive, and paper curl is excessive due to ink coverage exceeding the threshold for excessive ink coverage.

13. A method of defining printer media and inking intensity compatibility in a printing system as claimed in claim 12 wherein the test pattern comprises sub patterns printed with increasing ink coverage levels for identifying the threshold for excessive ink coverage.

14. A method of defining printer media and inking intensity compatibility in a printing system as claimed in claim 13 wherein the increasing ink coverage levels span a range of thresholds for excessive ink coverage for a variety of substrates.

* * * * *